United States Patent [19]
Roth et al.

[11] Patent Number: 5,408,887
[45] Date of Patent: Apr. 25, 1995

[54] DRIVE UNIT FOR DRIVING AGRICULTURAL IMPLEMENTS OR FOR EFFECTING THE DRIVE IN AGRICULTURAL IMPLEMENTS

[75] Inventors: Andreas Roth, Neunkirchen-Seelscheid; Hans-Jürgen Langen, Frechen; Hubert Grosse-Entrup, Lohmar, all of Germany

[73] Assignee: GKN Walterscheid GmbH, Germany

[21] Appl. No.: 117,416

[22] Filed: Nov. 8, 1993

[51] Int. Cl.⁶ ............................................. G01L 1/22
[52] U.S. Cl. ........................... 73/862.338; 73/862.191
[58] Field of Search ...................... 73/862.338, 862.191

[56] References Cited

U.S. PATENT DOCUMENTS

| | | | |
|---|---|---|---|
| 3,128,622 | 4/1964 | Lebow | 73/862.338 |
| 4,084,429 | 4/1978 | Boland | 73/862.338 X |
| 4,724,711 | 2/1988 | Sakakibara et al. | 73/862.338 X |
| 4,757,721 | 7/1988 | Horner et al. | 73/862.338 |
| 4,838,077 | 6/1989 | Shiffler et al. | 73/862.338 X |

FOREIGN PATENT DOCUMENTS

| | | |
|---|---|---|
| 1075864 | 2/1960 | Germany . |
| 3838081 | 6/1989 | Germany . |
| 4025279 | 2/1992 | Germany . |
| 2153721 | 7/1987 | Japan .............................. 73/862.338 |
| 62-299732 | 12/1987 | Japan . |

Primary Examiner—Richard E. Chilcot, Jr.
Assistant Examiner—Elizabeth L. Dougherty
Attorney, Agent, or Firm—Harness, Dickey & Pierce

[57] ABSTRACT

A drive unit 1 for driving agricultural implements or effecting the drive in agricultural implements, has an input shaft 4 and at least one output shaft 10, 10a and a torque measuring device associated with at least one of the shafts 4 or 10, 10a. The shafts 4, 10, 10a are rotatably held in two spaced bearings 5, 6, 13, 14. To determine shaft twisting as representative of the shaft torque, strain gauges 32, 32a are provided and associated with the first shaft 4. The gauges 32, 32a are attached to the outer face 19 of the first shaft 4 between its bearings 5, 6. An electronic measuring unit 31 is arranged and protected in a transverse bore 26 of the shaft 4. Slip rings, which serve to transmit values and energy, are arranged in a separate, sealed receiving space 33 outside the drive housing filled with lubricant, towards the connecting journal 7 of the first shaft 4. By arranging the electronic measuring unit 31 in a transverse bore 26 it is ensured that even at higher speeds, no rotational out-balance occurs. Furthermore, the measuring unit 31 is protected.

3 Claims, 3 Drawing Sheets

DRIVE UNIT FOR DRIVING AGRICULTURAL IMPLEMENTS OR FOR EFFECTING THE DRIVE IN AGRICULTURAL IMPLEMENTS

BACKGROUND OF THE INVENTION

The invention relates to a drive unit for driving agricultural implements or for effecting the drive in agricultural implements, especially an angular gear, with an input shaft and at least one output shaft and a torque measuring device associated with at least one of the shafts. The shafts are each rotatably held in two spaced bearings.

Such a drive with a torque measuring device is known from DE 38 16 828 C2, issued Sep. 27, 1990. In this case, the measuring device operates in a contact-free way. The electronic measuring unit is arranged outside the drive.

SUMMARY OF THE INVENTION

It is an object of the invention to design a drive unit for driving agricultural implements or for effecting the drive in agricultural implements in such a way that it is suitable for torque measuring devices in the case of which the sensor and electronic measuring unit are attached to the shaft itself, while ensuring at the same time that the running properties of the shaft are not, or only unsubstantially, influenced.

In accordance with the invention, the objective is achieved by attaching strain gauges to the outer face of the respective shaft between its bearings. To determine shaft twisting, the device, which is representative of the torque loading the shaft, is provided with a torque measuring device. The electronic measuring unit is arranged in a transverse bore of the shaft. A value and energy transmitter is arranged in a separate, sealed receiving space between the housing part accommodating the shaft and the shaft itself. Connecting cables are provided between the strain gauges, the electronic measuring unit and the value and energy transmitter.

An advantage of this design is that the electronic measuring unit can be accommodated in such a way that out-of-balance does not occur. The electronic measuring unit can be accurately positioned in the transverse bore. Because the strain gauges are arranged in a region located between the bearings, they are not affected by forces acting on them. Even with a relatively stiff shaft, the strain gauges provide a sufficiently high measuring accuracy. The electronic measuring unit arranged in the transverse bore and the strain gauges may be sealed in such a way that the space between the bearings can always be in contact with the circulating lubricant or the lubricant reserves for the drive in order to ensure adequate bearing lubrication. By arranging the value and energy transmitter in a space separated by seals, it is ensured that the measured torque values can safely be transmitted outward to release switching pulses and indicate these to the person monitoring the system. Furthermore, by arranging the value and energy transmitter in the way as described, it is also ensured that the cross-section of the connecting journal is not weakened.

A particularly advantageous assembly is obtained if the inventive idea is complemented by proposing to arrange the transverse bore for receiving the electronic measuring unit in the bearing seat face for the bearing adjoining the connecting journal of the shaft projecting from the drive unit. In this way, it is ensured that even at high shaft speeds the electronic measuring unit is safely held in the predetermined position and it is covered by the inner ring of the bearing. Furthermore, by arranging the electronic measuring unit underneath the inner bearing ring, it is adequately sealed so that it cannot be adversely affected by the drive lubricant, which heats up. The electronic measuring unit is preferably sealed in the transverse bore.

According to a further embodiment, the receiving space for the value and energy transmitter is arranged outside the space between the two bearings, towards the connecting journal of the shaft. In addition to separating the oil-lubricated bearings, it is possible, in this way, to ensure easy accessibility for repair purposes or for replacing the value and energy transmitters which are designed as slip rings.

Relative to the outer face of the shaft provided with the strain gauges and relative to the outer face of the shaft with which the value and energy transmitter is associated, the bearing seat face containing the transverse bore preferably includes an increased diameter, and in the region extending from the resulting annular faces towards the transverse bore, there are arranged bores for the connecting cables. In this way, it is ensured that the connecting cables are guided safely. The bores may also be sealed after the connecting cables have been guided through, thereby ensuring complete sealing. In this way, the lubricant is prevented from moving from the drive region into the receiving space for the value and energy transmitter.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention and its application in an agricultural implement is diagrammatically illustrated in the drawing wherein.

DETAILED DESCRIPTION OF THE PREFERRED EMBODIMENTS

Figure 1:
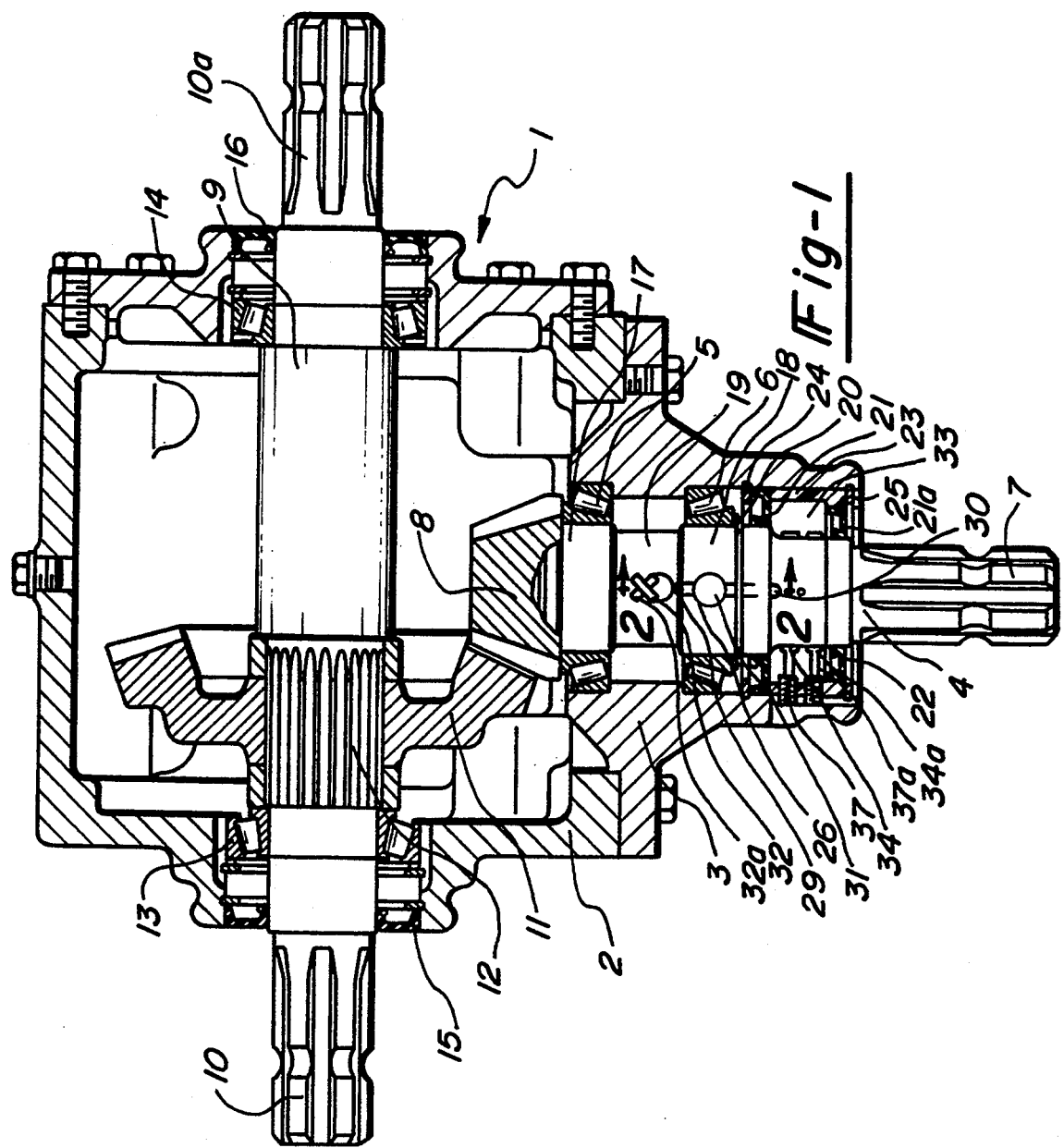
FIG. 1 is a section view through an angle drive in the plane of the shaft axes.
Figure 2:
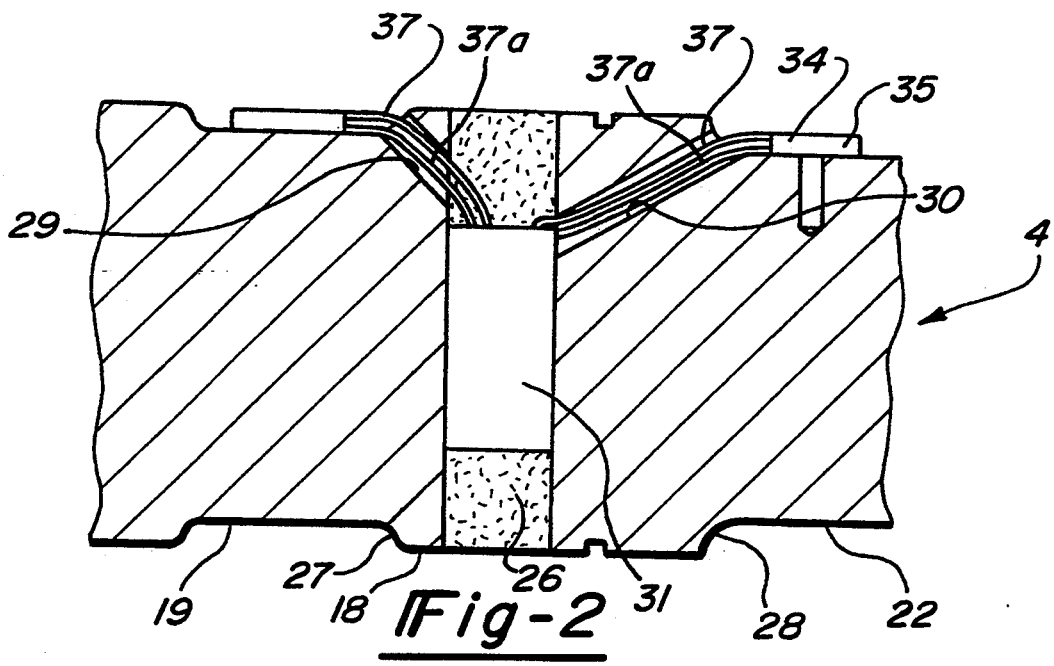
FIG. 2 is an enlarged section view of FIG. 1 along line 2—2 thereof.
Figure 3:
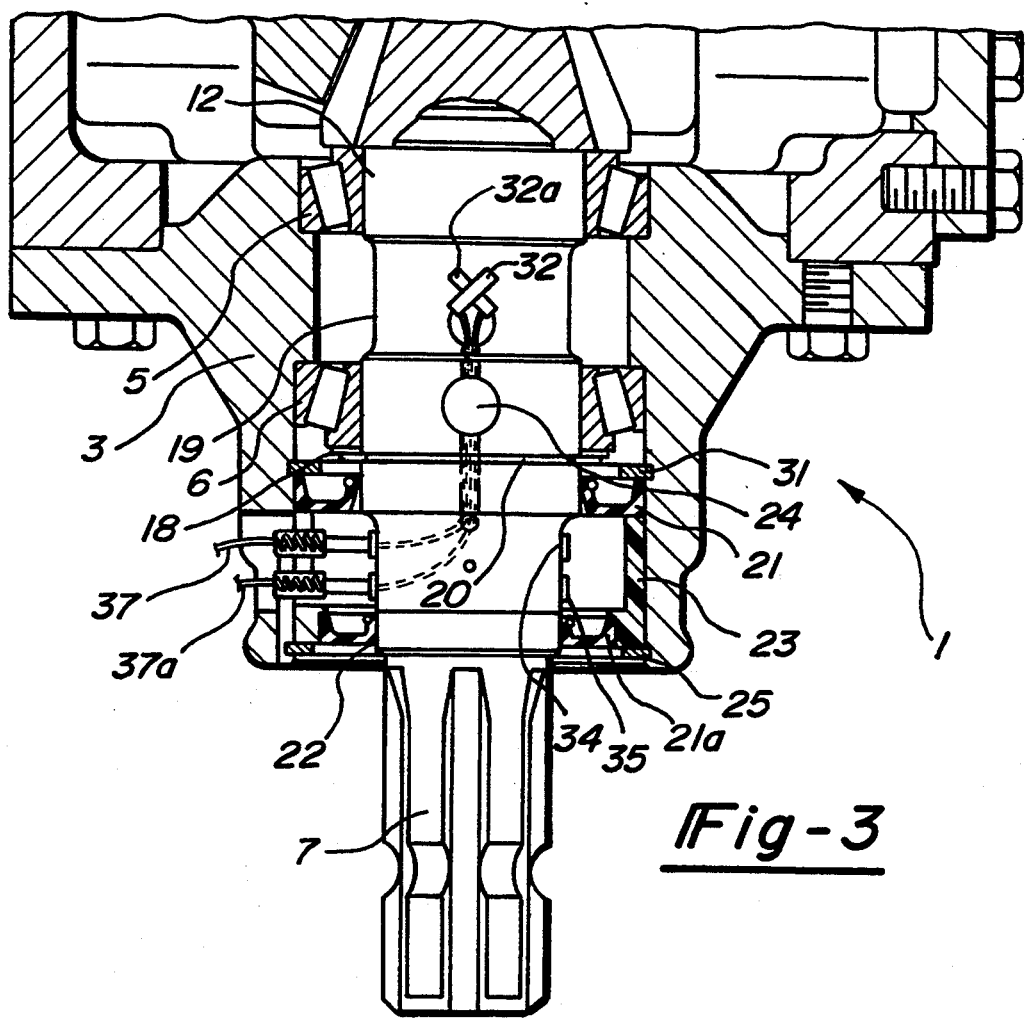
FIG. 3 is an enlarged cross section view of the design and arrangement of the torque measuring device for the first shaft.

The drive unit 1 illustrated in FIGS. 1 to 3 includes a drive housing 2 with an attached bearing housing 3. A first shaft 4 is held in bearings 5, 6 in the bearing housing 3. The shaft 4 includes a connecting journal 7 in the form of a multi-spline profile via which it is connected to a drive for example. The other end projecting into the drive housing 2 carries a bevel gear 8. The second shaft 9 is arranged transversely to the first shaft 4 and supported via bearings 13, 14 in the drive housing 2 and in a flange of same. The second shaft 9 is sealed by seals 15, 16 relative to the drive housing 2. The connecting journals of the second shaft projecting from the drive housing 2 have been given the reference numbers 10 and 10a. Between its bearings 13, 14, the second driveshaft 9 is provided with teeth 12 on which a bevel gear 11 is non-rotatingly held via teeth provided in its bore and axially removably secured via securing means. The teeth of the two bevel gears 8, 11 engage one another. The torque introduced via the connecting journal 7 of the first shaft 4 is transmitted via the two bevel gears 8, 11 to the second shaft 9 and from the shaft 9, via its connecting journals 10, 10a, to a unit to be driven.

The first shaft includes a seat face 17 for the first bearing 5. The seat face adjoins the bevel gear 8 and has an increased diameter. The inner ring of the first bearing 5 is accommodated on said seat face 17. The outer ring of the bearing 5 is held in a bored step of the bearing housing 3. All bearings 5, 6 and 13, 14 of the first and second shafts 4, 9 are designed as bevel roller bearings. They are arranged in such a way that the axial thrust resulting from the transmission of torque is accommodated when the teeth of the bevel gears 8, 11 are engaged.

The bearing seat face 18 receiving the bearing 6 adjoining the connecting journal 7 and also has an increased diameter as compared to the outer face 19 between the two seat faces 17, 18. The region of the bearing seat face 18 includes a groove for a securing ring 20 which is provided to hold the inner ring of the bearing 6. Furthermore, the bearing seat face 18 serves as a stop face for the seal 21 which is held in a bore of the bearing housing 3 also receiving the outer ring of the bearing 6 and is axially supported against a securing ring 24. The seal 21 serves to outwardly seal the housing interior and the interior of the bearing housing 3.

A spacing bush 23 is inserted into the receiving bore for the outer ring of the bearing 6 so as to adjoin the seal 21. The spacing bush 23 is secured against a securing ring 25 which is accommodated in a groove of the bore of the bearing member 3. A further seal 21a is received in the spacing bush 23 at an axial distance from the seal 21. The seal 21a has a sealing function relative to the outer face 22 of the shaft whose diameter is smaller than that of the bearing seat face 18.

The outer face 22 is followed by the connecting journal 7 of the first shaft 4, which projects outwardly from the bearing housing 3. On the outer face 19, whose diameter is reduced, between the two seat faces 17, 18 and bearings 5, 6, there are arranged two strain gauges 32, 32a which intersect one another at an angle of 90° and which intersect the rotational axis X of the first shaft 4 at an angle of 45. Any twisting of the first shaft 4 under torque is determined by the strain gauges and any bending moments which might occur are eliminated by the assembly. It forms part of the state of the art to provide such strain gauges 32, 32a and use them for torque determining purposes.

The strain gauges 32, 32a are connected via connecting cables 37, 37a to an electronic measuring unit 31 which is arranged in a transverse bore 26 of the first shaft 4. The transverse bore 26 extends radially relative to the rotational axis X and is arranged in the region of the bearing seat face 18 below the inner bearing ring of the bearing 6. Starting from the strain gauges 32, 32a, the connecting cables 37, 37a are guided through a first bore 29 towards the electronic measuring unit 31 and introduced into the transverse bore 26. The bore 29 starts from the annular face 27 produced between the bearing seat face 18 with the increased diameter and the outer face 19 whose diameter is reduced relative thereto, and ends in the transverse bore 26. The electronic measuring unit 31 is arranged in the transverse bore 26 in such a way that its mass does not generate any rotational out-of-balance when the first shaft 4 rotates. Sealing means are provided towards the bearing seat face 18 which fully seal the transverse bore 26 and also the bore 29 through which the connecting cables 37, 37a are guided. A further bore 30 starts from the end face 28 between the bearing seat face 18 and the outer face 22, whose diameter is also reduced and extends towards the connecting journal 7 and ends on the transverse bore 26. From there, the connecting cables 37, 37a starting from the electronic measuring unit 31 are guided further.

In the region of the receiving space 33 between the two seals 21, 21a, the outer face 22 is provided with slip rings 34, 34a which cooperate with slip ring receiving means secured in the spacing bush 23. The connecting cables 37, 37a start from the slip ring receiving means and are guided outwardly. On the one hand, the two connecting cables 37, 37a are suitable for supplying energy and on the other hand, they are suitable for transmitting measured values outwardly. The latter may be indicated in the tractor or implement to give the operative the actual torque value, but the signals may also be used to switch the drive on or off, for example.

Figure 4:
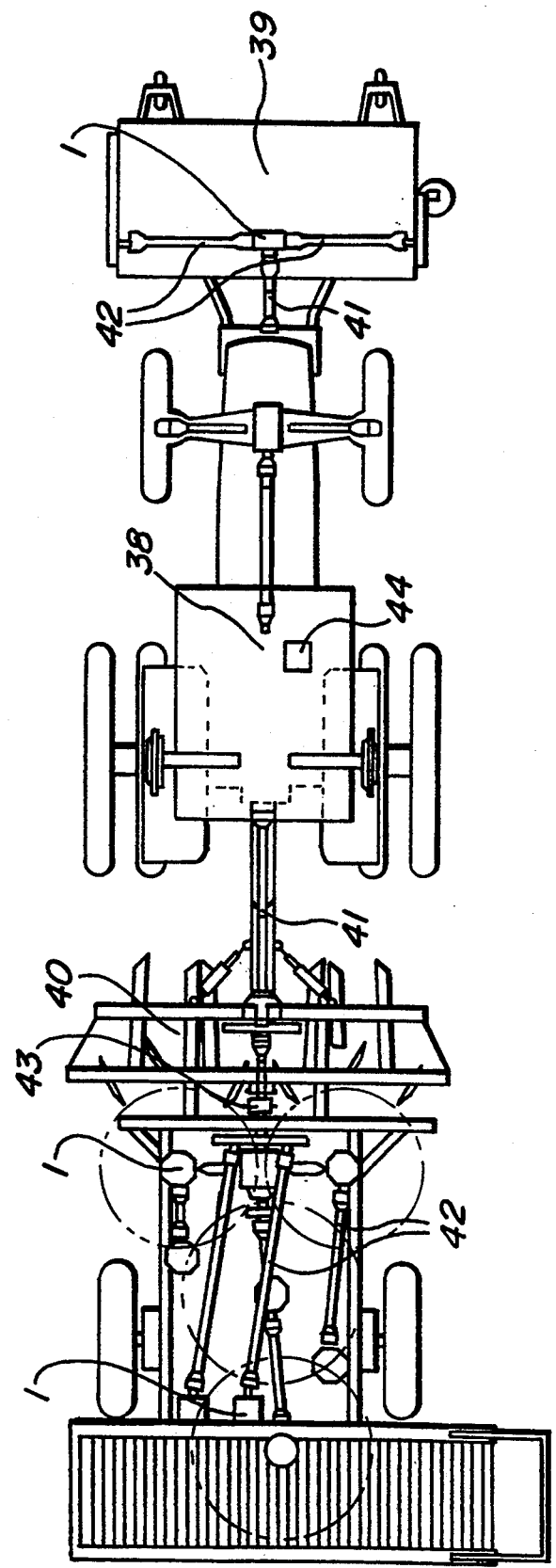
FIG. 4 is a plan view of a tractor with implements whose driveline comprises one or several drive units according to FIGS. 1 to 3.

FIG. 4 shows a combination of implements consisting of the tractor 38, the rear implement 40, in the form of a beet harvester, and the front implement 39. The working tools of the rear implement 40 and the front implement 39 receive their rotational movements required for driving purposes from the tractor 38 via a main driveshaft 41. The main driveshafts 41, via drives 1, drive auxiliary drives via auxiliary driveshafts 42. The drives 1 are designed as illustrated in FIGS. 1 to 3. To protect individual drivelines and auxiliary drives it is possible to provide couplings 43 which are designed as switching couplings and whose switching mechanism is controlled via the torque measuring device associated with the drive. The torque measuring device may also be connected to an indicator 44 for the tractor driver.

While the above detailed description describes the preferred embodiment of the present invention, the invention is susceptible to modification, variation, and alteration without deviating from the scope and fair meaning of the subjoined claims.

We claim:

1. A drive unit for driving agricultural implements or for effecting the drive in agricultural implements, comprising an input shaft and at least one output shaft and a torque measuring device associated with at least one of the shafts, said shafts each being rotatably held in two spaced bearings;

said torque measuring device includes strain gauges arranged and attached to an outer face of one of said shafts between its bearings, an electronic measuring unit is arranged in a transverse bore of the shaft, a value and energy transmitter is arranged in a separate, sealed receiving space between the housing part accommodating the shaft and the shaft, and the transverse bore for receiving the electronic measuring unit is arranged in a bearing seat face for the bearing adjoining a connecting journal of the shaft projecting from the drive unit;

and connecting cables are provided between the strain gauges, the electronic measuring unit and the value and energy transmitter;

said electronic measuring unit and the value and energy transmitter determine shaft twisting as being representative of the torque loading the shaft.

2. A drive unit according to claim 1, wherein the receiving space for the value and energy transmitter is arranged outside the space between the two bearings towards a connecting journal of the shaft.

3. A drive unit according to claim 1, wherein, said shaft includes bores arranged for receiving the connecting cables.

* * * * *

UNITED STATES PATENT AND TRADEMARK OFFICE
CERTIFICATE OF CORRECTION

PATENT NO. : 5,408,887
DATED : April 25, 1995
INVENTOR(S) : Andreas Roth, Hans-Jürgen Langen, Hubert Grosse-Entrup It is certified that error appears in the above-indentified patent and that said Letters Patent is hereby corrected as shown below:

On the cover page, please delete

"[22] Filed: Nov. 8, 1993"

and substitute therefor

-- [22] Filed: Sept. 7, 1993 --

On the cover page,
no Foreign Application Priority Data is stated.

Please insert:

Foreign Application Priority Data

September 19, 1992 [DE] Germany . . . . . P 42 31 412.7

Signed and Sealed this

Seventeenth Day of October, 1995

Attest:

BRUCE LEHMAN

*Attesting Officer*　　　*Commissioner of Patents and Trademarks*